(No Model.)
J. B. DOLAN.
NUT CLAMP.
No. 511,414. Patented Dec. 26, 1893.
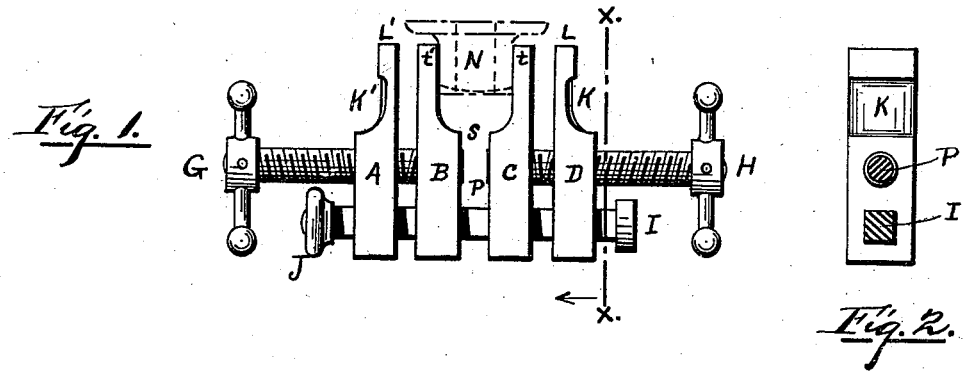
Fig. 1.
Fig. 2.
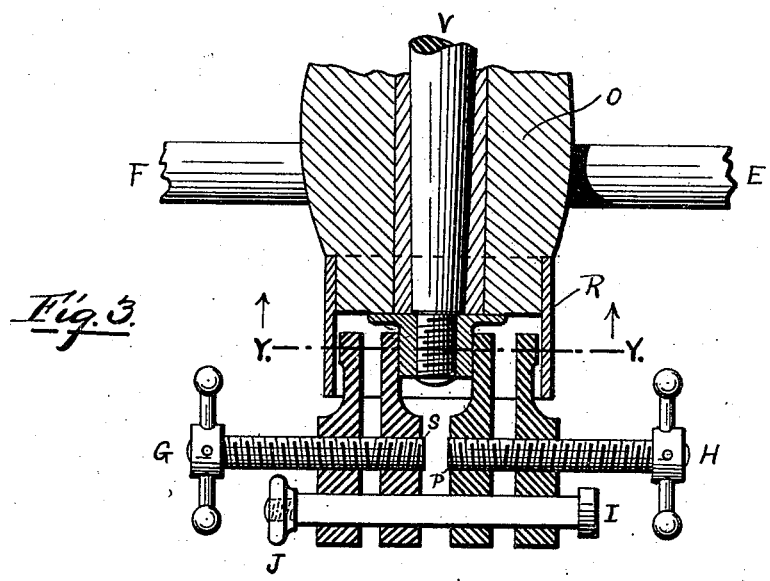
Fig. 3.
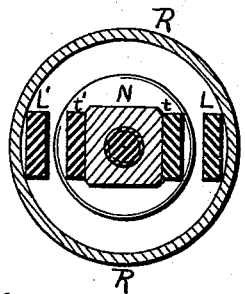
Fig. 4.
Witnesses.
Charles F. Hannigan
Clarence Stimm
Inventor:
John B. Dolan
by James L. Jenks
Atty.
THE NATIONAL LITHOGRAPHING COMPANY,
WASHINGTON, D. C.

UNITED STATES PATENT OFFICE.

JOHN B. DOLAN, OF CENTRAL FALLS, RHODE ISLAND.

NUT-CLAMP.

SPECIFICATION forming part of Letters Patent No. 511,414, dated December 26, 1893.

Application filed October 26, 1893. Serial No. 489,236. (No model.)

*To all whom it may concern:*

Be it known that I, JOHN B. DOLAN, a citizen of the United States, residing at Central Falls, in the county of Providence and State of Rhode Island, have invented certain new and useful Improvements in Nut-Clamps; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to improvements in nut-clamps especially adapted and intended to remove the axle nut which secures the wheel to the axle of carriages; and it consists essentially of two interior jaws which grasp the nut, and two exterior jaws to grip the inside of the rim of the wheel hub, said jaws being operated by two independent right and left hand threaded screws, the jaws being kept in a line by a square guide spindle passing through them.

The object of my invention is to provide a clamp which will for the time being make the axle-nut a part of the hub of the wheel so that revolving the wheel by its spokes in the proper direction will remove the nut, and revolving it in the opposite direction will secure the nut in place, the nut itself not having to be handled during the entire operation. These objects are attained by the device shown in the accompanying drawings in which—

Figure 1 is a lateral view of the device; Fig. 2 a sectional end view through *x—x* of Fig. 1. Fig. 3 is a sectional view showing the device in position on the axle-nut, and Fig. 4 a sectional view through Y—Y of Fig. 3.

Like letters refer to like parts throughout.

In Fig. 1, A and D are the exterior, and B and C are the interior jaws, kept in line by the square spindle I—J, on which they slide easily.

G—S and P—H are screws, each having a right and left thread thereon as shown, but in reverse order—*i. e.*, the thread next the handle H on P—H is left handed, while that next the extremity P is right handed; and in G—S the thread next the handle G is right hand, while that next the extremity S is left handed. By turning either of the screws, the interior jaws are brought nearer together, or farther apart, according to the direction in which the screw is turned, while the motion of the exterior jaws is exactly the reverse. A depression or clearance is made in the exterior jaws at K—K' so that they may grip the interior of the rim of the hub as far from its outer edge as possible, or where there is greater strength to resist their action.

N, Fig. 1, shows the nut grasped by the interior jaws B—C.

To operate my device, the interior jaws are adjusted to the nut as shown in Fig. 3, and the screws then turned until the exterior jaws grip the inside of the rim of the hub as shown in Figs. 3 and 4. The extremities of the exterior jaws L—L', Fig. 4, are purposely left angular to insure a firmer grip on the rim. When the clamp is adjusted, the wheel is revolved in the proper direction by the spokes E—F, and may be set one side without fear of losing the nut, which, by means of the clamp becomes practically a part of the wheel itself.

The advantages of my invention are that it may be adjusted to any wheel of ordinary make; it gives a greater leverage than can be gotten by a monkey-wrench; it obviates the danger of dropping or losing the nut when the wheel is removed in a poorly lighted place; and it does away with the necessity of handling a greasy nut and the consequent soiling of the hands or clothing.

Having now described my invention, what I claim, and desire to secure by Letters Patent, is—

A nut clamp consisting of two interior jaws; two exterior jaws; each interior jaw being connected with the adjacent exterior jaw by a screw having a right and left hand thread thereon; and a guide spindle passing through said jaws, all substantially as and for the purposes described.

In testimony whereof I affix my signature in presence of two witnesses.

JOHN B. DOLAN.

Witnesses:
CLARENCE KINNE,
GEORGE W. COLE.